US006398276B1

United States Patent
Smith

(10) Patent No.: US 6,398,276 B1
(45) Date of Patent: Jun. 4, 2002

(54) BUMPER GUARD

(76) Inventor: Herman L. Smith, 12175 SW. Tippitt Place, Tigard, OR (US) 97223

( * ) Notice: Subject to any disclaimer, the term of this patent is extended or adjusted under 35 U.S.C. 154(b) by 0 days.

(21) Appl. No.: 09/833,422

(22) Filed: Apr. 12, 2001

(51) Int. Cl.[7] ............ B60R 19/52; B60R 19/44
(52) U.S. Cl. ............ 293/142; 293/144; 293/115; 293/155
(58) Field of Search .............. 293/142, 143, 293/144, 115, 155

(56) References Cited

U.S. PATENT DOCUMENTS

| D159,392 S | | 7/1950 | Poncher et al. |
| 2,687,912 A | * | 8/1954 | Beauchamp ............ 293/115 |
| 2,799,494 A | | 7/1957 | Pollock |
| 3,431,005 A | | 3/1969 | Priefert |
| 3,438,667 A | | 4/1969 | Davis |
| 5,067,760 A | * | 11/1991 | Moore et al. ............ 293/115 |
| 5,277,465 A | | 1/1994 | Weir |
| 5,683,128 A | * | 11/1997 | Heyns ............ 293/115 |
| 6,022,057 A | | 2/2000 | Vermeulen |
| 6,231,093 B1 | * | 5/2001 | Storer ............ 293/115 |
| 6,290,271 B1 | * | 9/2001 | Geisler ............ 293/115 |

OTHER PUBLICATIONS

Copy of 2001 Mercedes–Benz Accessories catalog featuring a Stainless Steel Grill Guard. Mercedes–Benz USA, LLC, One Mercedes Drive, Montvale, NJ 07645.

* cited by examiner

Primary Examiner—Joseph D. Pape
Assistant Examiner—Greg Blankenship

(57) ABSTRACT

A bumper guard for preventing damage to the vehicle bumper of a motor vehicle. The bumper guard includes a bumper member including a pair of elongate members each having a first end and a second end. A bar is integrally coupled to and extends between the second ends of the elongate members such that the elongate members are orientated generally parallel to each other and perpendicular to the bar. Each of a pair of rods is integrally coupled to one of the first ends of the elongate members. The rods are orientated generally perpendicular to the elongate members and parallel to each other. Each of a pair of brackets removably couples the vehicle bumper to a vehicle. The brackets are spaced and coupled to a main cross frame. The brackets are adapted for removably receiving and coupling to one of the rods.

6 Claims, 1 Drawing Sheet

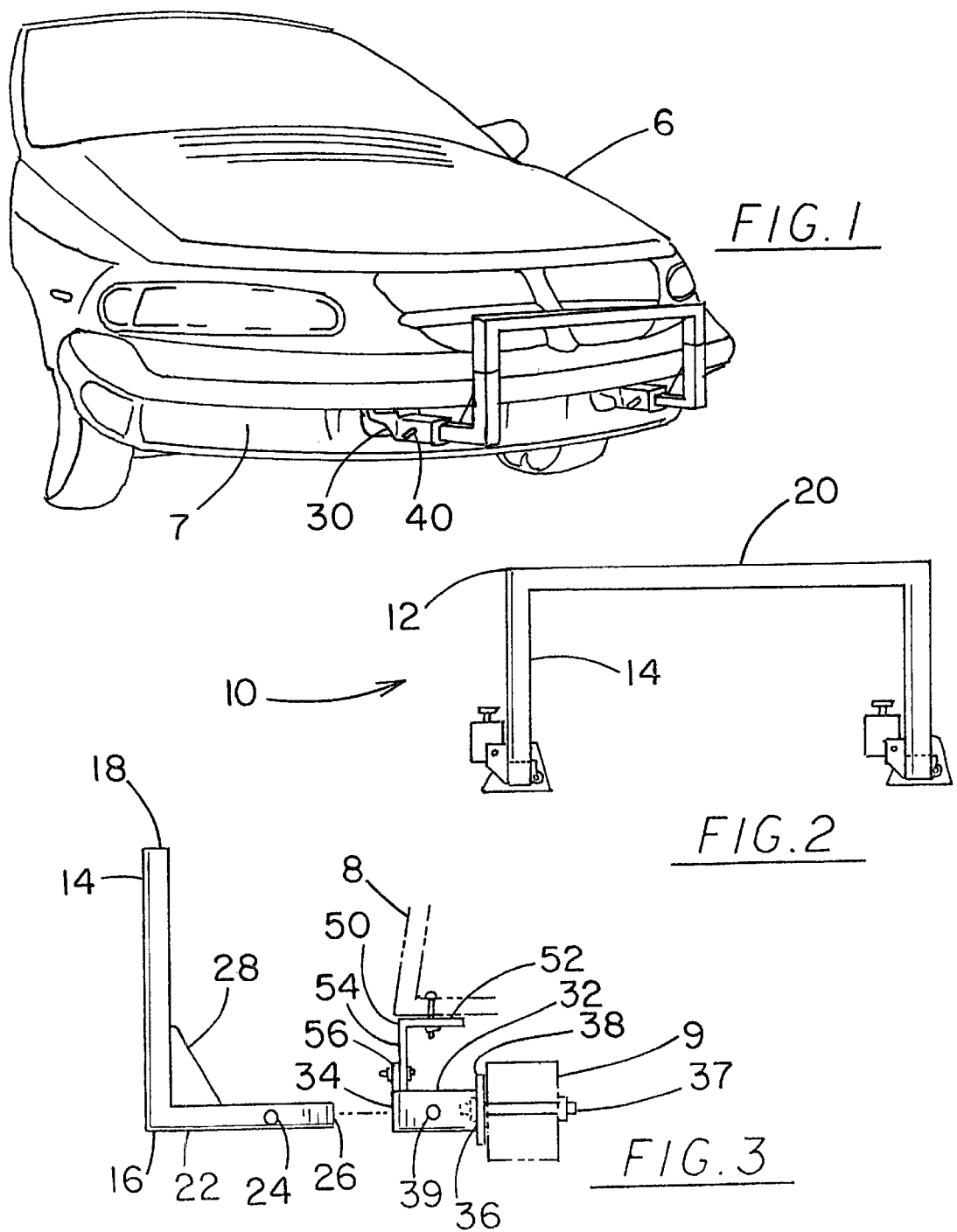

BUMPER GUARD

BACKGROUND OF THE INVENTION

1. Field of the Invention

The present invention relates to bumper devices and more particularly pertains to a new bumper guard for preventing damage to the bumper of a motor vehicle.

2. Description of the Prior Art

The use of bumper devices is known in the prior art. More specifically, bumper devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 3,438,667; 5,277, 465; 3,431,005; 2,799,494; 6,022,057; and U.S. Des, Pat. No. 159,392.

While these devices fulfill their respective, particular objectives and requirements, the aforementioned patents do not disclose a new bumper guard. The inventive device includes a bumper member including a pair of elongate members each having a first end and a second end. A bar is integrally coupled to and extends between the second ends of the elongate members such that the elongate members are orientated generally parallel to each other and perpendicular to the bar. Each of a pair of rods is integrally coupled to one of the first ends of the elongate members. The rods are orientated generally perpendicular to the elongate members and parallel to each other. Each of a pair of brackets removably couples the vehicle bumper to a vehicle. The brackets are spaced and coupled to a main cross frame. The brackets are adapted for removably receiving and coupling to one of the rods.

In these respects, the bumper guard according to the present invention substantially departs from the conventional concepts and designs of the prior art, and in so doing provides an apparatus primarily developed for the purpose of preventing damage to the vehicle bumper of a motor vehicle.

SUMMARY OF THE INVENTION

In view of the foregoing disadvantages inherent in the known types of bumper devices now present in the prior art, the present invention provides a new bumper guard construction wherein the same can be utilized for preventing damage to the bumper of a motor vehicle.

The general purpose of the present invention, which will be described subsequently in greater detail, is to provide a new bumper guard apparatus and method which has many of the advantages of the bumper devices mentioned heretofore and many novel features that result in a new bumper guard which is not anticipated, rendered obvious, suggested, or even implied by any of the prior art bumper devices, either alone or in any combination thereof.

To attain this, the present invention generally comprises a bumper member including a pair of elongate members each having a first end and a second end. A bar is integrally coupled to and extends between the second ends of the elongate members such that the elongate members are orientated generally parallel to each other and perpendicular to the bar. Each of a pair of rods is integrally coupled to one of the first ends of the elongate members. The rods are orientated generally perpendicular to the elongate members and parallel to each other. Each of a pair of brackets removably couples the vehicle bumper to a vehicle. The brackets are spaced and coupled to a main cross frame. The brackets are adapted for removably receiving and coupling to one of the rods.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new bumper guard apparatus and method which has many of the advantages of the bumper devices mentioned heretofore and many novel features that result in a new bumper guard which is not anticipated, rendered obvious, suggested, or even implied by any of the prior art bumper devices, either alone or in any combination thereof.

It is another object of the present invention to provide a new bumper guard which may be easily and efficiently manufactured and marketed.

It is a further object of the present invention to provide a new bumper guard which is of a durable and reliable construction.

An even further object of the present invention is to provide a new bumper guard which is susceptible of a low cost of manufacture with regard to both materials and labor, and which accordingly is then susceptible of low prices of sale to the consuming public, thereby making such bumper guard economically available to the buying public.

Still yet another object of the present invention is to provide a new bumper guard which provides in the apparatuses and methods of the prior art some of the advantages thereof, while simultaneously overcoming some of the disadvantages normally associated therewith.

Still another object of the present invention is to provide a new bumper guard for preventing damage to the bumper of a motor vehicle.

Yet another object of the present invention is to provide a new bumper guard which includes a bumper member including a pair of elongate members each having a first end and a second end. A bar is integrally coupled to and extends between the second ends of the elongate members such that the elongate members are orientated generally parallel to each other and perpendicular to the bar. Each of a pair of rods is integrally coupled to one of the first ends of the elongate members. The rods are orientated generally perpendicular to the elongate members and parallel to each other. Each of a pair of brackets removably couples the vehicle bumper to a vehicle. The brackets are spaced and coupled to a main cross frame. The brackets are adapted for removably receiving and coupling to one of the rods.

Still yet another object of the present invention is to provide a new bumper guard that allows a supplemental bumper to be retrofitted to motor vehicles to protect the vehicle's bumper from damage.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new bumper guard according to the present invention.

FIG. 2 is a schematic front perspective view of the present invention.

FIG. 3 is a schematic side view of the present invention.

DESCRIPTION OF THE PREFERRED EMBODIMENT

With reference now to the drawings, and in particular to FIGS. 1 through 3 thereof, a new bumper guard embodying the principles and concepts of the present invention and generally designated by the reference numeral 10 will be described.

As best illustrated in FIGS. 1 through 3, the bumper guard 10 generally comprises a device for positioning on a front side 7 of a motor vehicle 6 and is mountable to a vehicle front side frame 8 and a main cross frame 9. The device 10 includes a bumper member 12 including a pair of elongate members 14 each having a first end 16 and a second end 18. A bar 20 is integrally coupled to and extends between the second ends 18 of the elongate members 14 such that the elongate members 14 are orientated generally parallel to each other and perpendicular to the bar 20. Each of a pair of rods 22 is integrally coupled to one of the first ends 16 of the elongate members 14. Each of the rods 22 is orientated generally perpendicular to the elongate members 14 and parallel to each other. Each of the rods 22 has an aperture 24 extending therethrough and positioned nearer a free end 26 of the rod 22 than the elongated member 14. The apertures 24 have an axis orientated generally parallel to the bar 20. The bar 20 has a length preferably between 20 inches and 24 inches between the elongate members. Each of the elongate members 14 has a length from the bar to the rod 22 preferably between 12 inches and 18 inches. Each of the rods 22 has a length from the elongate members 14 to the free ends 26 preferably between 8 inches and 14 inches.

Each of a pair of bracing supports 28 is attached to a juncture of one of the rods 22 and an associated elongated member 14. Each of the bracing supports 28 has a generally triangular shape.

Each of pair of brackets 30 removably couples the bumper member 12 to the vehicle 6. Each of the brackets 30 is spaced for removably receiving one of the rods 22. The brackets 30 each comprise a tubular member 32, a securing member 40, and a coupler 50.

The tubular member 32 has a first end 34 and a second end 36. The second end 36 has a plate 38 thereon and the first end 34 is open. The tubular member 32 has a size adapted for extendably receiving one of the rods 22. The tubular member 32 has a hole 39 extending therethrough and positioned generally between the first 34 and second 36 ends of the tubular member 32. A fastener 37 extends through the plate 38 and the main cross frame 9 such that the bar 20 is generally horizontal and the elongate members 14 generally vertical when the aperture 24 in the rod 22 is coaxial with the hole 39 in the tubular member 32.

A securing member 40 is removably extendable through the hole 39 and the aperture 24 to releasably couple the tubular member to the rod. The securing member 40 comprises a pin.

The coupler 50 couples the tubular member 32 to the front side frame 8. The coupler 50 comprises a pair of plates 52, 54 integrally coupled to each other and orientated generally perpendicular to each other. A first 52 of the plates is attached to the front side frame. A second 54 of the plates is attached to a protruding member 56 integrally coupled to and extending upwardly from the tubular member 32.

In use, the brackets 30 are coupled to the frame portions 8, 9 of the vehicle 6 and the bumper member 10 is coupled to the brackets. The bumper member receives the shock from any front end collisions to prevent damage to the vehicle bumper.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A retrofittable bumper guard device for positioning on a front side of a motor vehicle the device being mountable to a vehicle front side frame and a main cross frame, said device comprising:

a bumper member including a pair of elongate members each having a first end and a second end, a bar being integrally coupled to and extending between said second ends of said elongate members such that said elongate members are orientated generally parallel to each other and perpendicular to said bar, each of a pair of rods being integrally coupled to one of said first ends of said elongate members, each of said rods being orientated generally perpendicular to said elongate members and parallel to each other;

a pair of brackets for removably coupling said bumper member to said vehicle, each of said brackets being spaced and coupled to said main cross frame, each of said brackets being adapted for removably receiving and coupling to one of said rods; and wherein each of said brackets includes a tubular member having a first end and a second end, said second end having a plate thereon and said first end being open, said tubular member having a size adapted for extendably receiving one of said rods.

2. The retrofittable bumper guard device as in claim 1, wherein said device further comprises:

each of said rods having an aperture extending therethrough and positioned nearer a free end of said rod than said elongated member, said apertures having an axis orientated generally parallel to said bar; and said tubular member having a hole extending therethrough and positioned generally between said first and second ends of said tubular member, a fastener extending through said plate and said main cross frame such that said bar is generally horizontal and said elongate members generally vertical when said aperture in said rod is coaxial with said hole in said tubular member.

3. The retrofittable bumper guard device as in claim 2, further comprising:

a securing member being removably extendable through said hole and said aperture to releasably couple said tubular member to said rod.

4. The retrofittable bumper guard device as in claim 1, further comprising:

a coupler couples said tubular member to said front side frame, said coupler comprising a pair of plates integrally coupled to each other and orientated generally perpendicular to each other, a first of the plates being attached to said front side frame, a second of the plates being attached to a protruding member integrally coupled to and extending upwardly from said tubular member.

5. A retrofittable bumper guard device for positioning on a front side of a motor vehicle the device being mountable to a vehicle front side frame and a main cross frame, said device comprising:

a bumper member including a pair of elongate members each having a first end and a second end, a bar being integrally coupled to and extending between said second ends of said elongate members such that said elongate members are orientated generally parallel to each other and perpendicular to said bar, each of a pair of rods being integrally coupled to one of said first ends of said elongate members, each of said rods being orientated generally perpendicular to said elongate members and parallel to each other, each of said rods having an aperture extending therethrough and positioned nearer a free end of said rod than said elongated member, said apertures having an axis orientated generally parallel to said bar, said bar having a length generally between 20 inches and 24 inches between said elongate members, each of said elongate members having a length from said bar to said rod generally between 12 inches and 18 inches, each of said rods having a length from said elongate members to said free ends generally between 8 inches and 14 inches;

a pair of bracing supports each being attached to a juncture of one of said rods and an associated elongated member, each of said supports having a generally triangular shape;

a pair of brackets for removably coupling said bumper to said vehicle, each of said brackets being spaced for removably receiving one of said rods, each of said brackets comprising;

a tubular member having a first end and a second end, said second end having a plate thereon and said first end being open, said tubular member having a size adapted for extendably receiving one of said rods, said tubular member having a hole extending therethrough and positioned generally between said first and second ends of said tubular member, a fastener extending through said plate and said main cross frame such that said bar is generally horizontal and said elongate members generally vertical when said aperture in said rod is coaxial with said hole in said tubular member;

a securing member being removably extendable through said hole and said aperture to releasably couple said tubular member to said rod, said securing member comprising a pin;

a coupler couples said tubular member to said front side frame, said coupler comprising a pair of plates integrally coupled to each other and orientated generally perpendicular to each other, a first of the plates being attached to said front side frame, a second of the plates being attached to a protruding member integrally coupled to and extending upwardly from said tubular member.

6. The retrofittable bumper guard device as in claim 1, further including:

a pair of bracing supports each being attached to a juncture of one of said rods and an associated elongated member.

\* \* \* \* \*